R. E. HALL.
METHOD OF AND MEANS FOR TRANSLATING SOUNDS.
APPLICATION FILED AUG. 18, 1914.
1,160,072.
Patented Nov. 9, 1915.
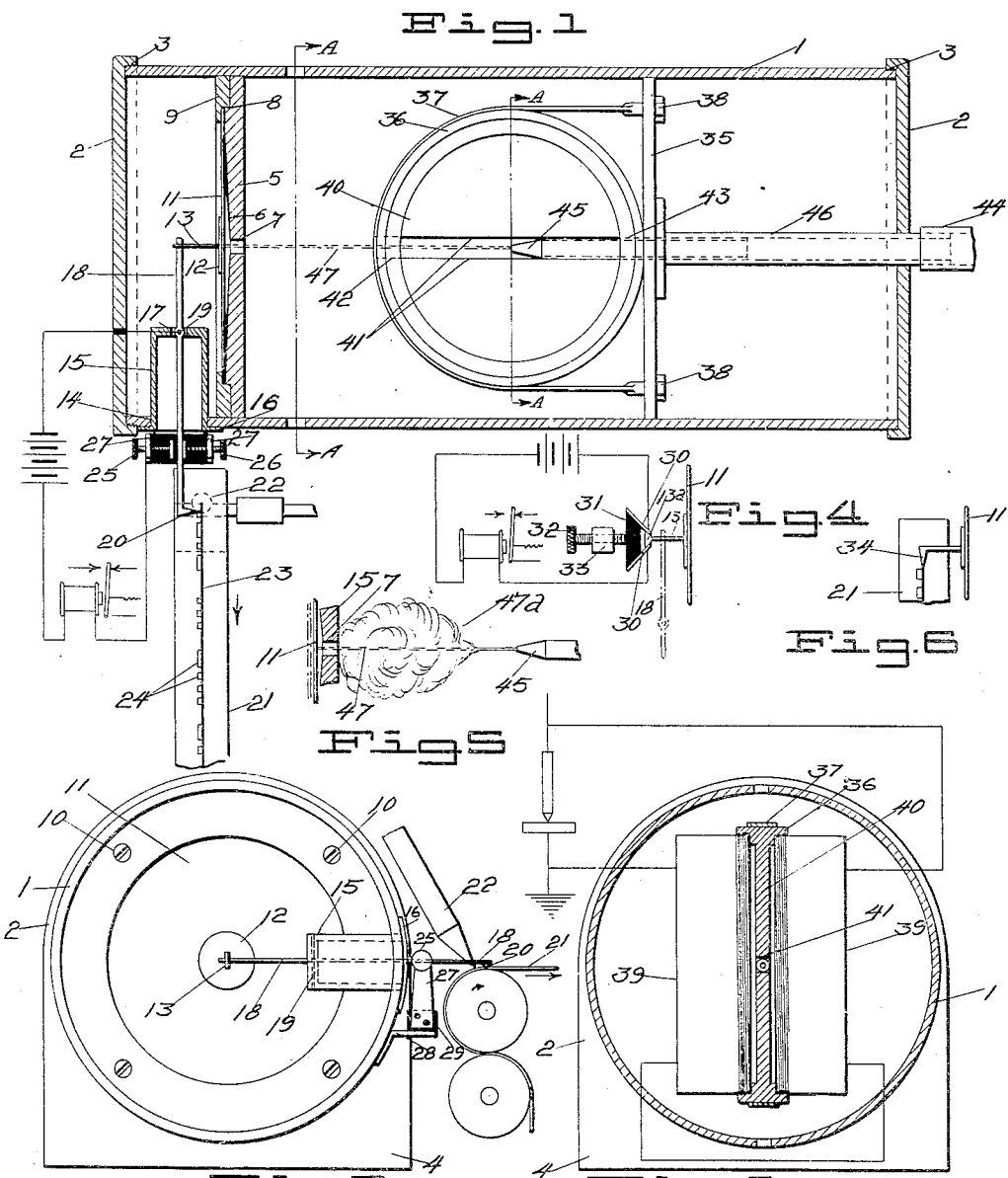
Witnesses:
Albert J. Chatter
H. R. Litzenberg
Inventor
Ray E. Hall
By
J. H. Mock
Attorney

UNITED STATES PATENT OFFICE.

RAY E. HALL, OF PORTLAND, OREGON, ASSIGNOR OF ONE-HALF TO CHARLES A. ROBERTSON, OF PORTLAND, OREGON.

METHOD OF AND MEANS FOR TRANSLATING SOUNDS.

1,160,072.   Specification of Letters Patent.   Patented Nov. 9, 1915.

Application filed August 18, 1914. Serial No. 857,333.

*To all whom it may concern:*

Be it known that I, RAY E. HALL, a citizen of the United States, residing at Portland, in the county of Multnomah and State of Oregon, have invented certain new and useful Improvements in Methods of and Means for Translating Sounds, of which the following is a specification.

My invention pertains to a method of and apparatus for translating the sounds produced by the receiving apparatus of wireless signaling devices into mechanical movements to and fro, each corresponding in duration to the duration of the individual sounds produced.

Wireless signals are commonly detected and received by the use of a receiver which is worn by the operator adjacent the ear. The sounds produced are generally so faint that the operator is subjected to a considerable nervous strain to detect all signals and messages and it has been found necessary in some instances to locate the receiving apparatus in a sound-proof room where absolute quiet is constantly maintained. Even with such precautions messages are sometimes unintelligible because of their faintness.

It is an object of my invention to provide a method and apparatus whereby the sound waves set up by the diaphragm of a wireless receiver are automatically translated into mechanical movements to and fro which actuate suitable indicating devices to produce signals, corresponding to such movements, of such magnitude that they are readily perceptible.

Other objects and advantages of my invention will be apparent as it is better understood by reference to the following specification in connection with the accompanying drawing in which—

Figure 1 is a sectional top plan view through the axis of the cylindrical casing and diaphragm. Fig. 2 is an end elevation of the device with the cover removed to show the recording mechanism. Fig. 3 is a sectional elevation of the cylindrical casing and receiving mechanism taken on the line A—A in Fig. 1. Fig. 4 shows a modified form of contacting mechanism for relaying messages, the view being partially in section and taken on the axial center line of the diaphragm. Fig. 5 illustrates the manner in which a jet of air is broken up by sound waves produced by the receivers when a message is being received. Fig. 6 shows the diaphragm pin used as a recording pin.

Referring to the drawings, 1 designates a cylindrical casing which is covered and supported at each end by a cover 2 secured as by threads at 3 having a base member 4.

A circular diaphragm plate 5 having a beveled face 6 and provided with an orifice 7 through its axis is rigidly secured within the casing near one end as shown and is provided with a shoulder at 8 to receive a diaphragm ring 9 which is attached by means of screws 10 so as to secure a flexible diaphragm 11 in place over the beveled face 6 of the plate and coaxial with the orifice 7. The diaphragm 11 is preferably made of some flexible material such as rubber and held taut across the face of the plate 5. A disk 12 carrying a projecting pin 13 is cemented or otherwise secured to the diaphragm coaxial therewith. The casing 1 is perforated at 14 to receive a cylindrical bearing member 15 having a flange at 16 by means of which it is attached to the casing with its axis horizontally coaxial with the cylinder so as to extend toward the center of cylinder.

The bearing member 15 is provided with an orifice at 17 adapted to loosely receive a recording and relaying finger 18 which is pivotally secured therein by means of a pin 19, and passes through an orifice provided in the end of the pin 13 so that axial fluctuations of the diaphragm will oscillate the finger which is provided at its outer end with a writing point 20.

A recording tape 21 is held by any suitable means so as to pass beneath and in contact with the writing point 20. The said writing point could be so constructed as to carry ink or other writing fluid for recording purposes but as it is desirable that the finger 18 be as light as possible a pen 22 preferably of the fountain type is mounted so as to produce a uniform flow of ink upon the tape as at 23. Oscillation of the finger 18 will cause the point 20 to intermittently dip into the ink line 23 and remove some of the ink so as to form dots and dashes 24 in a line alongside of the line 23, these dots and dashes representing the message in the usual code form.

The finger 18 may be used for relaying purposes by placing contacts at either side thereof as at 25 or 26 and wiring it in circuit with a current supply source, a relay or sounder and with the finger at its pivotal point at 19. In the illustration the contacts 25 and 26 constitute two screws which are adjustably carried by upright posts 27 mounted on an insulating block 29 attached to a bracket 28 carried by the casing 1. The form and arrangement of the contacts could be modified as shown in Fig. 4 in which the pin 13 is provided with a head 13$^a$ fitting movably between contacts 30 carried by an insulating block 31 which in turn is mounted upon a screw 32 threadedly mounted in a bearing 33. Fluctuations of the diaphragm 11 will cause the head 13$^a$ to reciprocate and make and break contact with the contacts 30 which are wired as shown in the illustration in circuit with a source of current and a relay or sounder or any other desired apparatus. As shown in Fig. 6 the recording pen could be attached directly to the diaphragm pin as at 34 although this arrangement is not so desirable as that shown in Fig. 1 on account of the decreased movement of the pen point.

The method of and means for transmitting the wireless messages through the diaphragm to the recording and relay mechanism will now be described. A plate 35 is rigidly mounted in the casing as a support for the receiver frame 36 which is held in place by a metal band 37 attached to the plate at 38. A receiver 39 of the usual form is threadedly held in the frame 36 at each side thereof with its diaphragm disposed at a slight distance from the dividing wall 40 provided in the frame 36. The dividing wall is slotted horizontally through its axis as at 41 and orifices are provided in the frame at 42 and 43 so as to register with the slot 41. An air supply tube 46 is attached to the plate 35 extends outwardly therefrom through the rear cover 2 where it connects with a pipe or tube 44 leading from an air or other fluid supply source, air being preferably used. The term "fluid" is used in its proper sense, including both gases and liquids. The tube 44 is provided with a discharge nozzle 45 having a reduced opening in its outer end adapted to discharge the air or other fluid in an aciform jet.

It will be apparent that the orifice 7 in diaphragm 5, the orifice 42 and slot 41 in frame 36 and the tube just mentioned are all in axial alinement, the end of the nozzle 45 being disposed at the center of the frame 36 and between the receivers 39 so that the jet of air or other fluid from the nozzle 45 will pass through the slot 4 and orifices 42 and 7 as shown at 47 so as to impinge against the diaphragm 11. Vent holes 50 are provided in the casing 1 to permit the air to escape after it has served its purpose. It is necessary that a constant, steady flow of air be provided so that the diaphragm 11 will be held under tension slightly away from its relaxed position without fluctuating except when the air jet is purposely interrupted or broken up by sound waves arising from the vibratory actions of the receiver diaphragms. The receivers are connected in the usual manner with the usual wireless apparatus as indicated in Fig. 3, 48 designating a silicon detector and 49 the wire leading to the antenna, the wires being properly insulated where they pass through the casing 1.

In operation the fluctuations of the diaphragms of the receivers 39 caused by the receiving of a message will intermittently produce sound waves in the static air between said diaphragms and surrounding the air jet thereby breaking up and interrupting the jet of air as shown in Fig. 5 at 47$^a$. Throughout the time that the air jet is thus interrupted the diaphragm 11 will be permitted to relax and return to normal position and thereby cause the point 20 to move away from the line 23 and form a short line at 24 whose length will be regulated according to the duration of the receiver diaphragm fluctuations which are usually regulated to represent the dots and dashes of a predetermined code. It is obvious therefore that the coded message will be recorded upon the tape 21 which of course must pass beneath the pen point at a uniform rate of speed. The message, as is evident, may also be relayed by means of the relay mechanism previously described.

The relatively gross changes in form which the fluid jet assumes under the action of sound waves impinging thereon are referred to hereafter as the varying phases of the jet and it will be readily understood that the term "phases" as employed by me does not comprehend the minute variations in form, comprising the condensations and rarefactions, which would be an inherent feature of the propogation of sound waves, without destruction of form, through the jet, since I do not utilize the jet for this purpose.

I am aware of a Patent No. 336,203 granted to C. A. Bell on February 16, 1886, which discloses a method of transmitting and reproducing sound waves by the use of a fluid jet which throws a diaphragm into sonorous vibrations corresponding to those impressed upon the jet. In Bell's device the diaphragm of the transmitter is caused to vibrate in unison with the sound waves, the vibrations of the diaphragm being of the same period as the sound waves transmitted. My present invention is entirely distinct from that of Bell because I utilize a fluid jet to produce in a movable medium movements that have no resemblance in period to sound waves, each movement corresponding in duration to the duration of individual sounds. I therefore expressly disclaim any intention to claim the use of a fluid jet to transmit sound vibrations without destruction of their form, as disclosed by Bell.

It will be readily understood from the foregoing description that I have perfected a method and apparatus whereby the constant nervous strain, under which wireless operators work, is eliminated. In the preferred embodiment of the invention whenever a signal is received a clearly audible sound is produced by the sounder in the relay circuit and a permanent record is made, whether the operator is present or engaged with other matters.

It will be noted that various modifications may be made throughout the structure shown without departing from the spirit of the invention, as for instance, by altering the form of the casing which merely acts as a sound proof box, or the receiver mounting or by holding the diaphragm in a different manner, all or either of which could readily be done without materially affecting the operation of the device. If desired one of the receivers could be dispensed with although two will operate more efficiently.

What is claimed is:—

1. A method of causing sounds of relatively small volume to be readily perceptible which consists in subjecting a medium capable of mechanical movement to and fro to the action of a fluid jet adapted to assume varying phases requiring relatively gross changes of form, impressing sound vibrations on said jet to produce said varying phases, whereby movements of lesser period and greater magnitude than sound vibrations are set up in said medium, and transferring said movements to suitable indicating media.

2. A method of causing sounds of relatively small volume to be readily perceptible which consists in subjecting a medium capable of mechanical movement to and fro to the action of a gaseous jet adapted to assume varying phases requiring relatively gross changes in form, impressing sound vibrations on said jet to produce said varying phases, whereby movements, each of a duration corresponding to the duration of the individual sounds, are set up in said medium, and transferring said movements to suitable indicating media.

3. A method of causing sounds of relatively small volume to be readily perceptible which consists in subjecting a medium capable of mechanical movement to and fro to the action of an air jet adapted to assume varying phases requiring relatively gross changes in form, impressing sound vibrations on said jet to produce said varying phases, whereby movements, each of a duration corresponding to the duration of the individual sounds, are set up in said medium, and transferring said movements to suitable indicating media.

4. A method of causing sounds of a relatively small volume to be readily perceptible which consists in subjecting an elastic medium capable of mechanical movement to and fro to the action of a fluid jet adapted when disrupted to assume a varied form, causing sound vibrations to impinge on and disrupt said jet, whereby movements of lesser period and greater magnitude than sound vibrations are set up in said elastic medium, and transferring said movements to suitable indicating media.

5. A method of causing sounds of relatively small volume to be readily perceptible which consists in subjecting an elastic medium capable of mechanical movement to and fro to the action of a gaseous jet adapted when disrupted to assume a varied form, causing sound vibrations to impinge on and disrupt said jet, whereby movements, each of a duration corresponding to the duration of the sounds, are set up in said elastic medium, and transferring said movements to suitable indicating media.

6. A method of causing sounds of relatively small volume to be readily perceptible which consists in subjecting an elastic medium capable of reciprocatory movement to the action of an air jet adapted when disrupted to assume a varied form, causing sound vibrations to impinge on and disrupt said jet, whereby reciprocatory movements, each of a duration corresponding to the duration of the sounds, are set up in said elastic medium, and transferring said reciprocatory movements to suitable indicating media.

7. A device for translating sound waves into mechanical movements of appreciably greater magnitude than sound vibrations, comprising a medium capable of to and fro movement, means for subjecting said medium to a constant pressure, and sound producing means disposed in proximity to said pressure means to vary said pressure by sound waves from said sound producing means, whereby movements are produced in said medium, each corresponding in duration to the sounds produced by said sound producing means.

8. A device for translating sound waves into mechanical movements of appreciably greater magnitude than sound vibrations, comprising a medium capable of to and fro movement, means for subjecting said medium to a constant pressure, and a wireless receiver disposed in proximity to said pressure means, to vary said pressure by sound waves from said receiver, whereby movements are produced in said medium, each corresponding in duration to the sounds produced by said receiver.

9. A device for translating sound waves into mechanical movements of appreciably greater magnitude than sound vibrations, comprising a medium capable of to and fro movement, means adapted to direct a fluid jet under constant pressure against said medium, and sound producing means disposed in proximity to said fluid jet directing means whereby said jet is intermittently disrupted by sound waves from said sound producing means, to vary said pressure and thereby produce movements of said medium, each corresponding in duration to the duration of sounds produced by said sound producing means.

10. A device for translating sound waves into mechanical movements of appreciably greater magnitude than sound vibrations, comprising a medium capable of to and fro movement, means adapted to direct an air jet under constant pressure against said medium, and sound producing means disposed in proximity to said air jet directing means, whereby said jet is intermittently disrupted by sound waves from said sound producing means, to vary said pressure and thereby produce movements of said medium, each corresponding in duration to the duration of the sounds produced by said sound producing means.

11. A device for translating sound waves into mechanical movements of appreciably greater magnitude than sound vibrations, comprising a medium capable of to and fro movement, means adapted to direct a fluid jet under constant pressure against said medium, and a wireless receiver disposed in proximity to said fluid jet directing means, whereby said jet is intermittently disrupted by sound waves from said receiver, to vary said pressure and thereby produce movements of said medium, each corresponding in duration to the duration of the sounds produced by said receiver.

12. A device for translating sound waves into mechanical movements of appreciably greater magnitude than sound vibrations, comprising a medium capable of to and fro movement, means adapted to direct an air jet under constant pressure against said medium, and a wireless receiver disposed in proximity to said air jet directing means, whereby said jet is intermittently disrupted by sound waves from said receiver, to vary said pressure and thereby produce movements of said medium, each corresponding in duration to the duration of the sounds produced by said receiver.

13. A device for translating sound waves into mechanical movements of appreciably greater magnitude than sound vibrations, comprising an elastic diaphragm capable of to and fro movement, means for subjecting said diaphragm to a constant pressure, and sound producing means disposed in proximity to said pressure means to vary said pressure by sound waves from said sound producing means, whereby movements are produced in said diaphragm, each corresponding in duration to the duration of the sounds produced by said sound producing means.

14. A device for translating sound waves into mechanical movements of appreciably greater magnitude than sound vibrations, comprising an elastic diaphragm capable of to and fro movement, means for subjecting said diaphragm to a constant pressure, and a wireless receiver disposed in proximity to said pressure means to vary said pressure by sound waves from said receiver, whereby movements are produced in said diaphragm, each corresponding in duration to the duration of the sounds produced by said receiver.

15. A device for translating sound waves into mechanical movements of appreciably greater magnitude than sound vibrations, comprising an elastic diaphragm capable of to and fro movement, means adapted to direct a fluid jet under constant pressure against said diaphragm, and sound producing means disposed in proximity to said fluid jet directing means, whereby said jet is intermittently disrupted by sound waves from said sound producing means, to vary said pressure and thereby produce movements of said elastic medium, each corresponding in duration to the duration of the sounds produced by said sound producing means.

16. A device for translating sound waves into mechanical movements of appreciably greater magnitude than sound vibrations comprising an elastic diaphragm capable of to and fro movement, means adapted to direct an air jet under pressure against said diaphragm, and sound producing means disposed in proximity to said air jet directing means, whereby said jet is intermittently disrupted by sound waves from said sound producing means, to vary said pressure and thereby produce movements of said elastic medium, each corresponding in duration to the duration of the sounds produced by said sound producing means.

17. A device for translating sound waves into mechanical movements of appreciably greater magnitude than sound vibrations, comprising an elastic diaphragm capable of reciprocatory movement, means adapted to direct a fluid jet under constant pressure against said diaphragm, and a wireless receiver disposed in proximity to said fluid jet directing means, whereby said jet is intermittently disrupted by sound waves from said receiver, to vary said pressure and thereby produce movements of said elastic medium, each corresponding in duration to the duration of the sound produced by said receiver.

18. A device for translating sound waves into mechanical movements of appreciably greater magnitude than sound vibrations, comprising an elastic diaphragm capable of reciprocatory movement, means adapted to direct an air jet under constant pressure against said diaphragm, and a wireless receiver disposed in proximity to said air jet directing means, whereby said air jet is intermittently disrupted by sound waves from said receiver to vary said pressure and thereby produce movements of said elastic medium, each corresponding in duration to the duration of the sounds produced by said receiver.

19. In a device of the character described, the combination of a support having an opening therein, an elastic diaphragm capable of reciprocatory movement secured thereto, at one side thereof, means adapted to produce a fluid jet normally directed through said opening and adapted to subject said diaphragm to a constant pressure, and sound producing means disposed in proximity to said fluid jet producing means, whereby said jet is intermittently disrupted by sound waves from said sound producing means, to vary said pressure and thereby produce movements of said elastic diaphragm, each corresponding in duration to the duration of the sounds produced by said sound producing means.

20. In a device of the character described, the combination of a support having an opening therein and a concave surface, an elastic diaphragm capable of reciprocatory movement secured thereto, adjacent said concave surface, means adapted to produce a fluid jet normally directed through said opening and adapted to subject said diaphragm to a constant pressure and sound producing means disposed in proximity to said fluid jet producing means, whereby said jet is intermittently disrupted by sound waves from said sound producing means, to vary said pressure and thereby produce movements of said elastic diaphragm, each corresponding in duration to the duration of the sounds produced by said sound producing means.

21. In a device of the character described, the combination of a support having an opening therein, an elastic diaphragm capable of reciprocatory movement secured thereto at one side thereof, means adapted to produce an air jet normally directed through said opening and adapted to subject said diaphragm to a constant pressure, and sound producing means disposed in proximity to said air jet producing means, whereby said jet is intermittently disrupted by sound waves from said sound producing means, to vary said pressure and thereby produce movements of said elastic diaphragm, each corresponding in duration to the duration of the sounds produced by said sound producing means.

22. In a device of the character described, the combination of a support having an opening therein and a concave surface, an elastic diaphragm capable of reciprocatory movement secured thereto adjacent said concave surface, means adapted to produce an air jet normally directed through said opening and adapted to subject said diaphragm to a constant pressure, and sound producing means disposed in proximity to said air jet producing means, whereby said jet is intermittently disrupted by sound waves from said sound producing means, to vary said pressure and thereby produce movements of said elastic diaphragm corresponding in duration to the duration of the sounds produced by said sound producing means.

23. In a device of the character described, the combination of a support having an opening therein, a medium capable of reciprocatory movement secured thereto at one side thereof, means adapted to produce a fluid jet normally directed through said opening and adapted to subject said medium to a constant pressure, sound producing means disposed in proximity to said fluid jet producing means, whereby said jet is intermittently disrupted by sound waves from said sound producing means, to vary said pressure and thereby produce movements of said elastic diaphragm corresponding in duration to the duration of the sounds produced by said sound producing means, and means secured to said diaphragm for transferring the movements produced therein by the variations in said pressure.

24. In a device of the character described, the combination of a support having an opening therein, a medium capable of reciprocatory movement secured thereto at one side thereof, means adapted to produce a fluid jet normally directed through said opening and adapted to subject said medium to a constant pressure, sound producing means disposed in proximity to said fluid jet producing means, whereby said jet is intermittently disrupted by sound waves from said sound producing means to vary said pressure and thereby produce movements of said elastic diaphragm corresponding in duration to the duration of the sounds produced by said sound producing means, means secured to said diaphragm for transferring the movements produced therein by the variations in said pressure, and indicating means connected therewith.

25. In a device of the character described, the combination of a support having an opening therein, a medium capable of reciprocatory movement secured thereto at one side thereof, means adapted to produce a fluid jet normally directed through said opening and adapted to subject said medium to a constant pressure, sound producing means disposed in proximity to said fluid jet producing means, whereby said jet is intermittently disrupted by sound waves from said sound producing means, to vary said pressure and thereby produce movements of said elastic diaphragm corresponding in duration to the duration of the sounds produced by said sound producing means, means secured to said diaphragm for transferring the movements produced therein by the variations in said pressure, and recording means connected therewith.

26. In a device of the character described, the combination of a support having an opening therein and a concave surface, an elastic diaphragm capable of reciprocatory movement secured thereto adjacent said concave surface, means adapted to produce an air jet normally directed through said opening and adapted to subject said diaphragm to a constant pressure, sound producing means disposed in proximity to said air jet producing means, whereby said jet is intermittently disrupted by sound waves from said sound producing means, to vary said pressure and thereby produce movements of said elastic diaphragm corresponding in duration to the duration of the sounds produced by said sound producing means, and means secured to said diaphragm for transferring the movements produced therein by the variations in said pressure.

27. In a device of the character described, the combination of a support having an opening therein and a concave surface, an elastic diaphragm capable of reciprocatory movement secured thereto adjacent said concave surface, means adapted to produce an air jet normally directed through said opening and adapted to subject said diaphragm to a constant pressure, sound producing means disposed in proximity to said air jet producing means, whereby said jet is intermittently disrupted by sound waves from said sound producing means, to vary said pressure and thereby produce movements of said elastic diaphragm corresponding in duration to the duration of the sounds produced by said sound producing means, means secured to said diaphragm for transferring the movements produced therein by the variations to said pressure, and indicating means connected therewith.

28. In a device of the character described, the combination of a support having an opening therein and a concave surface, an elastic diaphragm capable of reciprocatory movement secured thereto adjacent said concave surface, means adapted to produce an air jet normally directed through said opening and adapted to subject said diaphragm to a constant pressure, sound producing means disposed in proximity to said air jet producing means, whereby said jet is intermittently disrupted by sound waves from said sound producing means, to vary said pressure and thereby produce movements of said elastic diaphragm corresponding in duration to the duration of the sounds produced by said sound producing means, means secured to said diaphragm for transferring the movements produced therein by the variations in said pressure, and recording means connected therewith.

29. In a device of the character described, the combination of a sound proof casing, a support therein having an opening and a concave surface, an elastic diaphragm capable of reciprocatory movement secured thereto adjacent said concave surface, means adapted to produce a fluid jet normally directed through said opening and adapted to subject said diaphragm to a constant pressure, a wireless receiver disposed on either side of said jet producing means in close proximity to said fluid jet, whereby said jet is intermittently disrupted by sound waves from said receiver, to vary said pressure and thereby produce movements of said elastic diaphragm corresponding in duration to the duration of the sounds produced by said sound producing means, and a lever secured to said diaphragm for transferring the movements produced therein by the variations in said pressure.

30. In a device of the character described, the combination of a sound proof casing, a support therein having an opening and a concave surface, an elastic diaphragm secured thereto adjacent said concave surface, means adapted to produce a fluid jet normally directed through said opening and adapted to subject said diaphragm to a constant pressure, a wireless receiver disposed on either side of said jet producing means in close proximity thereto, whereby said jet is intermittently disrupted by sound waves from said receiver to vary said pressure and thereby produce movements of said elastic diaphragm corresponding in duration to the duration of the sounds produced by said sound producing means, a lever secured to said diaphragm for transferring the movements produced therein by the variations in said pressure, and indicating means connected to said lever.

31. In a device of the character described, the combination of a sound proof casing, a support therein having an opening and a concave surface, an elastic diaphragm capable of reciprocatory movement secured thereto adjacent said concave surface, means adapted to produce a fluid jet normally directed through said opening and adapted to subject said diaphragm to a constant pressure, a wireless receiver disposed on either side of said jet producing means in close proximity thereto, whereby said jet is intermittently disrupted by sound waves from said receiver, to vary said pressure and thereby produce movements of said elastic diaphragm corresponding in duration to the duration of the sounds produced by said sound producing means, a lever secured to said diaphragm for transferring the movements produced therein by the variations in said pressure, and recording means connected to said lever.

32. In a device of the character described, the combination of a sound proof casing, a support therein having an opening and a concave surface, an elastic diaphragm capable of reciprocatory movement secured thereto adjacent said concave surface, means adapted to produce an air jet normally directed through said opening and adapted to subject said diaphragm to a constant pressure, a wireless receiver disposed on either side of said jet producing means in close proximity thereto, whereby said jet is intermittently disrupted by sound waves from said receiver, to vary said pressure and thereby produce movements of said elastic diaphragm corresponding in duration to the duration of the sounds produced by said sound producing means, and a lever secured to said diaphragm for transferring the movements produced therein by the variations in said pressure.

33. In a device of the character described, the combination of a sound proof casing, a support therein having an opening and a concave surface, an elastic diaphragm capable of reciprocatory movement secured thereto adjacent said concave surface, means adapted to produce an air jet normally directed through said opening and adapted to subject said diaphragm to a constant pressure, a wireless receiver disposed on either side of said jet producing means in close proximity thereto, whereby said jet is intermittently disrupted by sound waves from said receiver to vary said pressure and thereby produce movements of said elastic diaphragm corresponding in duration to the duration of the sounds produced by said sound producing means, a lever secured to said diaphragm for transferring the movements produced therein by the variations in said pressure, and indicating means connected to said lever.

34. In a device of the character described, the combination of a sound proof casing, a support therein having an opening and a concave surface, an elastic diaphragm capable of reciprocatory movement secured thereto adjacent said concave surface, means adapted to produce an air jet normally directed through said opening and adapted to subject said diaphragm to a constant pressure, a wireless receiver disposed on either side of said jet producing means in close proximity thereto, whereby said jet is intermittently disrupted by sound waves from said receiver, to vary said pressure and thereby produce movements of said elastic diaphragm corresponding in duration to the duration of the sounds produced by said sound producing means, a lever secured to said diaphragm for transferring the movements produced therein by the variations in said pressure, and recording means connected to said lever.

In testimony whereof I affix my signature in the presence of two witnesses.

RAY E. HALL.

Witnesses:
 ALBERT J. MATTOR,
 V. E. HOLSTON.

Copies of this patent may be obtained for five cents each, by addressing the "Commissioner of Patents, Washington, D. C."